Figure 7:
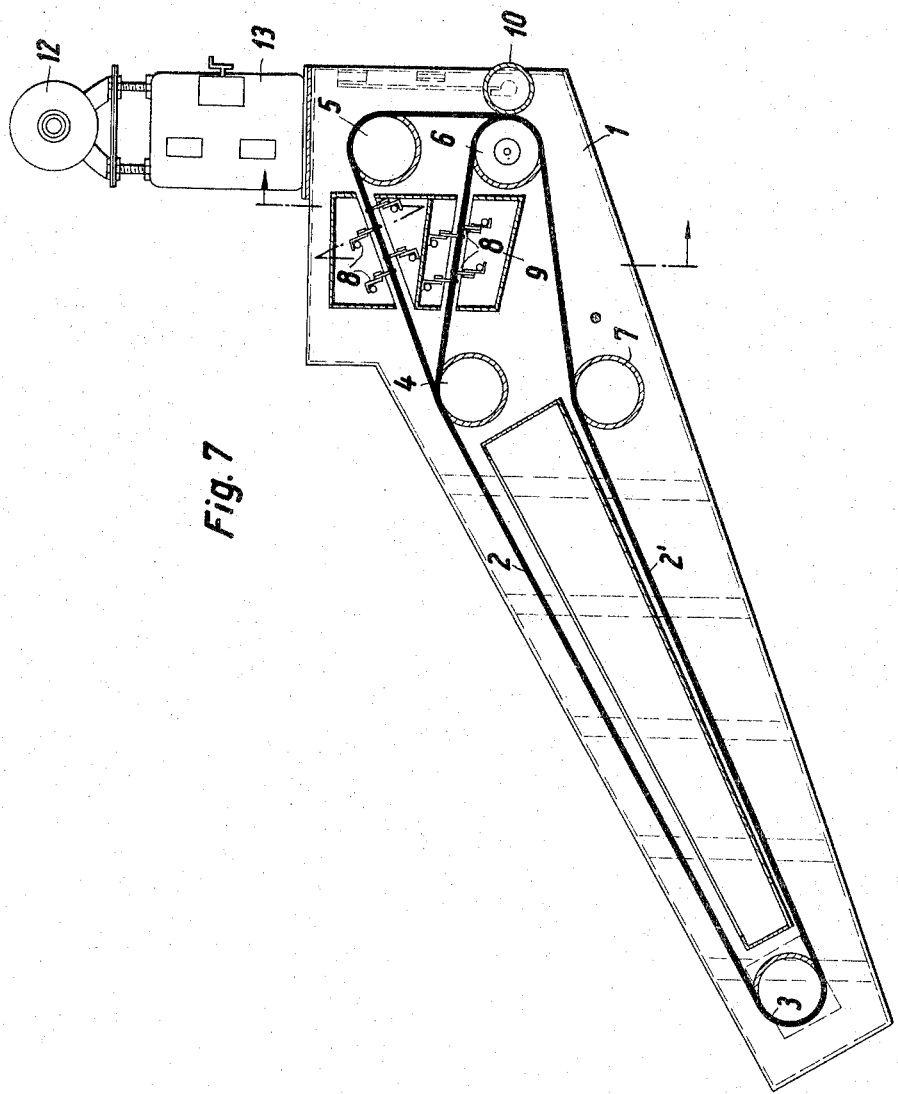

April 18, 1967  F. GRABBE ETAL  3,314,545
CLEANING WATER SURFACES
Filed Nov. 14, 1963  3 Sheets-Sheet 1
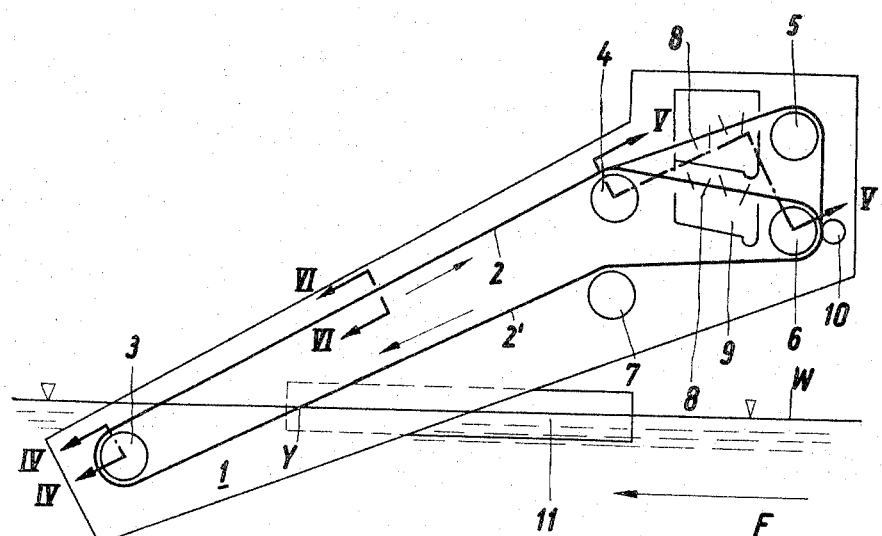
Fig.1
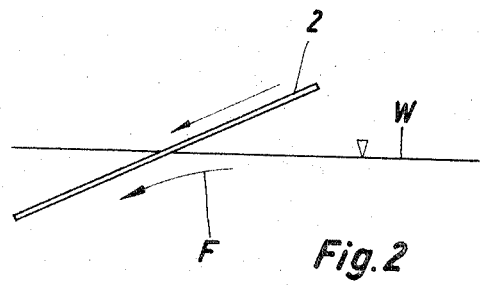
Fig.2
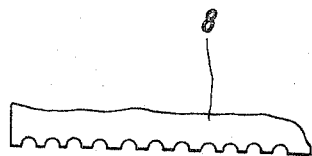
Fig.3
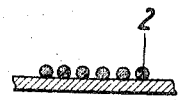
Fig.4
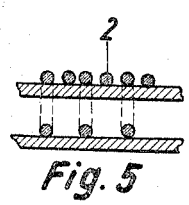
Fig.5
Fig.6
Inventors:
Friedbert Grabbe,
Karl Hintersdorf April 18, 1967 F. GRABBE ETAL 3,314,545
CLEANING WATER SURFACES
Filed Nov. 14, 1963 3 Sheets-Sheet 2

Inventors:

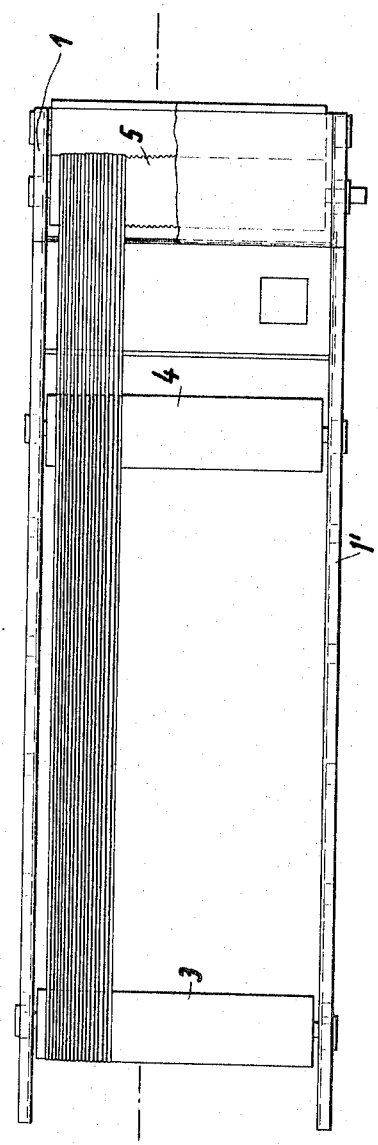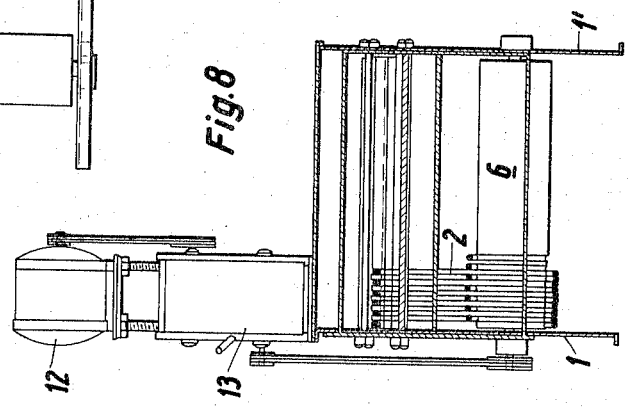

3,314,545
CLEANING WATER SURFACES
Friedbert Grabbe, Oelberg 21, Essen-Katernberg, Germany, and Karl Hintersdorf, Untere Fuhr 1, Essen, Germany
Filed Nov. 14, 1963, Ser. No. 323,685
Claims priority, application Germany, Nov. 20, 1962, G 36,447
6 Claims. (Cl. 210—242)

Work has been going on for some considerable time on the removal of oil and other impurities which float on water. Scoop devices and other apparatuses have been used for this purpose but none are entirely satisfactory. The main disadvantage, for example, with scoop devices is that they must remove considerable quanties of water to deal with thin floating layers of oil or other floating impurities. A difficulty in using them on flowing water is that the oil layer is disturbed when the scoop enters the water and this upsets the smooth approach of the oil.

In accordance with the present invention a method of cleaning a water surface by removing oil and other similar floating impurities comprises arranging an endless conveyor belt, which is made of a material to which oil sticks, so that the water surface flows relatively to the conveyor with a bottom run of the belt extending downwards at an inclination to and through the water surface but in the direction of flow; driving the belt so that it moves down along the bottom run and picks up oil as it passes through the surface before passing around a roller which is immersed within the water and up along an upper run to a cleaning station; and removing the oil, which has been picked up, from the belt at the cleaning station.

This arrangement has the particular advantage that the flow of water relative to the conveyor causes the layers of oil and other impurities to approach the bottom run of the belt and to stick to it. The oil is assisted in sticking to the belt because the lower run is dry and because the hydrostatic pressure of the water forces the oil against the belt as it is carried beneath the surface of the water under the belt. This results in a substantially complete removal of oil from the water surface and the proportion of water which is removed with the oil is surprisingly small.

In accordance with another aspect of the invention, an apparatus for carrying out the novel method comprises an endless conveyor belt made of a nonabsorbent material to which oil sticks, the belt, which runs over two or more separately mounted rollers, being arranged to be mounted, in use, so that a bottom one of the rollers is immersed in the water and the lower run of the belt extends downwards at an inclination to and through the surface of the water; a cleaner for removing oil from the belt at or near where it passes over an upper one of the rollers; and a motor for driving a belt so that the lower run moves downwardly; the arrangement being such that when in use the apparatus is mounted so that the lower run extends in the direction of flow of oil bearing water relatively to the apparatus, the lower run picks up oil where it passes through the surface of the water and passes around the lower roller and up to the cleaner where the oil is removed from the belt.

The belt is preferably smooth and made of a plastic material such as polyvinyl chloride.

The belt may comprise a number of endless component bands, for example of circular section, which are arranged adjacent but spaced apart side by side. The belt can then be cleaned by comb-like scrapers the teeth of which project between the component bands. Indeed, in order that the bands may be spaced as closely as possible together to provide as large a surface area as possible when picking up oil from the surface of water whilst being spaced sufficiently far apart to allow a sturdy comb to be used for cleaning, one group of alternate bands are preferably spread apart from the intervening groups of alternate bands adjacent the top roller, the spreading being produced by three rollers arranged in a triangle with one group of bands passing directly between a first and a second one of the rollers along one side of the triangle and the other group of bands passing between the first and second rollers over a third one of the rollers and along the other two sides of the triangle, oil scrapers being provided which embrace each group of bands from both sides.

The belt may be driven from the motor through a variable speed transmission unit so that the linear speed of the belt can be adjusted. This may be desirable to adjust the rate at which the lower run of the belt enters the water so that the component of velocity of the lower run parallel to the surface of the water is substantially the same as the rate of flow of the water relatively to the apparatus so that there is substantially no relative movement between the water and the belt. This greatly assists in causing the oil to stick to the belt.

The belt, all the rollers and the cleaner are preferably arranged between two side plates which are adjustably mounted on a framework so that the inclination of the lower run to and the height of the apparatus relatively to a water surface can be adjusted. In this way the belt and the immersed lower roller can readily be brought into the most advantageous position.

The apparatus can be provided with a pair of laterally spaced intake blades arranged at the bottom of the side plates at the level of the water surface for directing water to the lower run of the belt. This greatly increases the effective width of water which is cleaned by supplying to the belt oil and impurities which would otherwise float past the side edges of the belt.

The apparatus may be a stationary installation for use in flowing water or it may be arranged to be mounted on a craft so that it can be used in stagnant water. Most conveniently, however, it is arranged to float on its own floats on water and to be self-propelled.

One example of an apparatus constructed in accordance with the present invention is illustrated in the accompanying drawings; in which:
FIGURE 1 is a diagrammatic side view of the apparatus in use;
FIGURE 2 is a diagram illustrating the principal underlying the inventive method;
FIGURE 3 is a plan of one of the oil scrapers;
FIGURES 4 to 6 are sections taken on the lines IV—IV, V—V, and VI—VI in FIGURE 1 respectively; and
FIGURES 7 to 9 are views of the apparatus in vertical longitudinal section, front elevation and plan respectively.

A number of rollers 3 to 7 are mounted between two side uprights 1, 1' which can be seen in FIGURES 7 and 8 and which, in use, extend to below the level W of the water. Two endless belts 2 formed by a number of component bands which are made of a non-absorbent plastic substance that is adhesive to oil run over the rollers 3 to 7. The belt bottom run 2', starting from the top rollers 5, 6, extends in the direction of water flow to the roller 3 disposed below the water level; after reversal at the roller 3 the belt top run extend in the opposite direction to a top distributing roller 4. From the roller 4 the individual bands are separated and pass alternately to the top reversing rollers 5, 6 which are disposed one above another. This separation is sufficient to provide space for scrapers 8 which cooperate in pairs to engage right around the bands and remove the oil from them. A tensioning roller 7 is provided along the bottom runs 2'.

As can be seen in FIGURE 1, the bottom portion of the belt 2' extends into the onflowing water in the direction F of flow thereof, and its inclined bottom run 2' move in the direction of water flow. This factor is of importance for the required effect. The movement of the inclined bottom run 2' in the direction of water flow increases the effect by a pumping action which can be further increased by the provision at the rear of the system of a marine screw or the like. Since the water flow is onto the bottom run 2' of the conveyor belt, the oil floating on the water makes direct contact with the outer surface of the conveyor belt and sticks to it before being conveyed upwards along the upper run 2. The same effect occurs when the flow conditions just described are produced in stagnant water by the cleaning apparatus being mounted on a craft which is moved appropriately through the water to produce the flow F of water, relatively to the apparatus.

The immersed roller 3 should dip far enough into the water for the belt to run straight as it leaves the water, otherwise some of the oil on the belt may become detached by centrifugal force.

The component bands 2 are disposed one beside another at a close spacing so that the water which they pick up can drain away through between them and the whole surface of the component bands can therefore be operative in holding oil. The oil is carried along through the water because it sticks to the bands which rae not impaired by oil. The use of bands for the belt makes a comparatively large surface available for adhesion. Other solids floating on the water will not in general be picked up by the belt but are carried along by the water. The apparatus can therefore be used in water containing large proportions of ballast.

The impurities which stick to the bands 2 pass over the rollers 3 and 4 and are fed to comb-like scrapers 8 (visible in FIGURES 1 and 3) which separate the impurities from the bands 2. The impurities drop onto interception trays 9 which are emptied with or without the use of special conveyors.

A roller 10 which helps to increase the friction between the belt 2 and the roller 6 may, like the other rollers, be given a high coeffiecient of friction by being roughened. The belt 2 is driven by a motor 12 (visible in FIGURES 7 and 8) via one or more of the rollers 4 to 6. For adaptation to the conditions of each individual case, for instance, to the rate of water flow and to the nature of the oil, the motor speed, i.e., the speed at which the belt 2 runs, can be varied by a variable speed unit 13. The pressures at which the scrapers 8 bear against the bands 2 can also be carried to suit individual requirements.

The apparatus according to the invention can be used alone or in association with other constructional units in series or parallel with it. The supply of the oil floating on the water can be controlled by intake elements 11.

The apparatus according to the invention is of use in stagnant and running waters and, as thorough research has shown, can even be used in very dirty waste waters, as in main ditches, clarification plants and so on. One of its great advantages is that it can be used in flowing waters since it is very difficult with other means to remove oil from flowing waters. For instance, at water speeds of more than about 20 cm./sec. the known systems cannot retain and pick up the oil. However, in the case of the inventive method and apparatus, the approach speed of the impurities is not retarded by any back-up effects, and so the device operates satisfactorily even in fast-flowing waters and ditches. It has been found in practical tests that the oil impurities picked up by the apparatus can be removed substantially completely from the surface of the water, depending upon the nature, in a single working step, and that only small proportions of water are picked up together with the oil. Another advantage is that the apparatus according to the invention is light in weight and can be produced at relatively low cost.

We claim:

1. Apparatus for removing oil and other similar floating impurities forming an upper layer of a flow of water, comprising an endless conveyor belt formed of a plurality of endless component bands located adjacent but spaced apart from one another and mounted on at least one lower roller and one upper roller spaced from one another, said belt being composed of material to which the oil sticks and having an upper run and a substantially straight lower run, said belt being adapted to be passed downwardly through the layer of oil and impurities into the water therebeneath so that the lower run extends into the water at an inclinded angle to the surface thereof in the direction of water flow, motor means for driving the belt so that said lower run thereof travels in a direction corresponding generally to the direction of water flow whereby oil from the upper layer is entrainable by said lower run through the water therebeneath, around the lower roller immersed in the water and upwardly out of the water along said upper run, and a cleaner for removing the oil from said belt located adjacent said upper run thereof between the surface of the water and said upper roller, the bands being made of a plastic material and the cleaner being formed by comb-like scrapers which scrape oil from the bands adjacent the upper roller into an oil collecting tank.

2. Apparatus according to claim 1, in which one group of alternate bands are spread apart from the intervening group of alternate bands adjacent the top roller, the spreading being produced by three rollers arranged in a triangle with one group of bands passing directly between a first and a second one of the rollers along one side of the triangle and the other group of bands passing between the first and second rollers over a third one of the rollers and along the other two sides of the triangle, oil scrapers being provided which embrace each group of bands from both sides.

3. Apparatus according to claim 1, in which the belt and all the rollers and cleaner are arranged between two side plates which are adjustably mounted on a frame work so that the inclination of the lower run and the height of the apparatus relative to a water surface can be adjusted.

4. Apparatus according to claim 3, which is provided with a pair of laterally spaced intake blades arranged at the bottom of the side plates at the level of the water surface for directing water to the lower run of the belt.

5. Apparatus according to claim 1, in which the motor means drives the belt through a variable speed transmission unit so that the linear speed of the belt can be adjusted.

6. Apparatus according to claim 1, which is arranged to float on water and is self-propelled so as to be useful for cleaning stagnant water.

References Cited by the Examiner

UNITED STATES PATENTS

| | | | |
|---|---|---|---|
| 1,860,819 | 5/1932 | Schamberger | 210—523 |
| 2,247,460 | 7/1941 | Wright | 210—401 X |
| 2,470,418 | 5/1949 | Verner | 210—523 |
| 3,146,192 | 8/1964 | McClintock | 210—525 X |
| 3,219,190 | 11/1965 | Thune | 210—242 |

FOREIGN PATENTS 280,389  11/1927  Great Britain.

REUBEN FRIEDMAN, *Primary Examiner.*

S. ZAHARNA, *Assistant Examiner.*